UNITED STATES PATENT OFFICE.

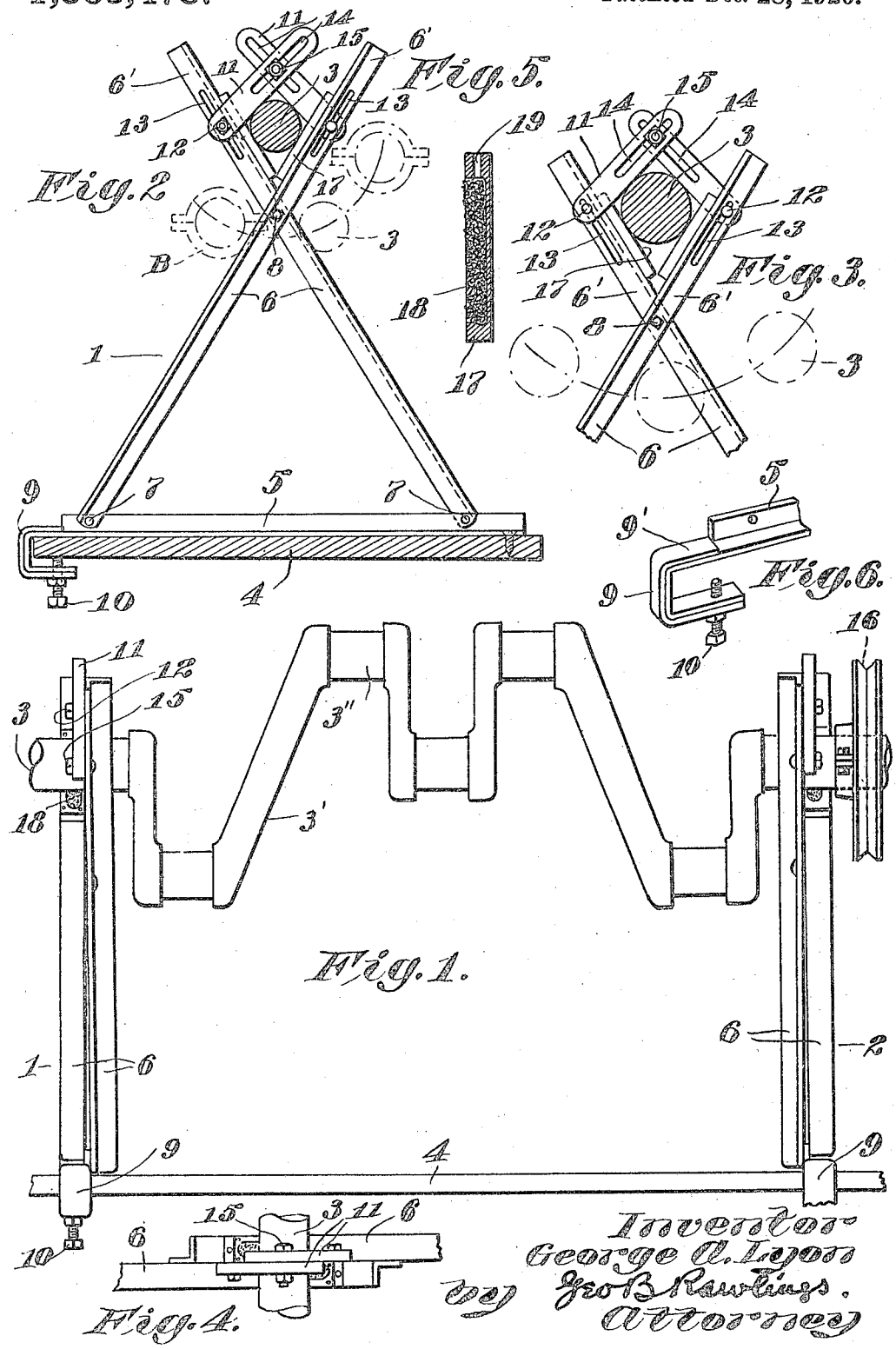

GEORGE A. LYON, OF ARLINGTON HEIGHTS, MASSACHUSETTS.

WORK-STAND.

1,363,478.     Specification of Letters Patent.     Patented Dec. 28, 1920.

Application filed August 21, 1919. Serial No. 319,004.

*To all whom it may concern:*

Be it known that I, GEORGE A. LYON, a citizen of the United States, residing at Arlington Heights, in the county of Middlesex and State of Massachusetts, have invented a new and useful Work-Stand, of which the following is a specification.

This invention relates to a work-stand for supporting a crank shaft while its bearings are being fitted or tested. In making bearing replacements, the usual practice is to first coat the crank pin with Prussian blue or similar marking substance and to then apply the halves of the bearing to the crank pin, whereupon the crank shaft is slowly swung back and forth to cause the marking substance to be rubbed onto the high parts of the bearing where the fit is too tight and thus indicate the places where the bearing is to be scraped. The bearing is then removed and scraped, and the process repeated until proper fit is obtained. In testing for trueness, the crank shaft is rotated on its axis past a piece of chalk or the like which is so held as to contact the crank pins if they be out of true. These replacements are usually made at garages, and frequently no convenient apparatus is available for sustaining the weight of the crank shaft while supporting it in such manner as to allow it to swing freely in testing and to leave the repair-man's hands free to the task of fitting and scraping the bearing. Consequently, the repair-man has had to improvise some sort of a bracket on the spot, and such expedients as have been devised have necessarily been makeshift affairs, and have not therefore been generally satisfactory.

The object of my present invention is to provide a simple and convenient stand of this class which will afford proper support and bearing for the crank shaft while permitting the shaft to be freely swung back and forth or rotated through a complete revolution, and which may be readily set up and collapsed and when collapsed may be conveniently carried by the repair-man from job to job. This object, together with certain other features of advantage which will appear more fully hereinafter, is secured in the device of the present invention, the construction and operation of which, together with an illustrative embodiment which I have found satisfactory in use and well adapted to the requirements of manufacture, is described and illustrated in the following specification and drawings forming a part thereof. Throughout the specification and drawings, like reference characters are correspondingly employed, and in the drawings:

Figure 1 is a front view of a work-stand in accordance with my invention, and showing a crank shaft supported thereon in position for testing.

Fig. 2 is a vertical section, and indicating somewhat diagrammatically by the dotted lines the capacity for free rotation about its axis permitted the crank shaft by my present work-stand.

Fig. 3 is a detail view, similar to Fig. 2, and showing the stand adjusted to accommodate a crank shaft of larger diameter than that illustrated in Fig. 2.

Fig. 4 is a plan detail at one of the journals of the stand.

Fig. 5 is a detail section particularly illustrating one of the protective elements for preventing scratching of the crank shaft, and Fig. 6 is a detail perspective particularly illustrating one of the bench clamps.

My stand comprises at least two supports 1 and 2, depending upon the weight and length of the crank shaft 3 which is to be supported. The supporting frames 1 and 2 are of duplicate construction and are adapted to be fixed in spaced vertical relation upon a work bench or the like 4, as shown in Fig. 1, to support and provide bearing for the crank shaft at the ends thereof, leaving an open unobstructed space therebetween through which the cranks 3' and crank pins 3'' may freely swing in testing, as indicated in dotted lines Figs. 2 and 3. I have indicated at B, dotted line showing of Fig. 2, a bearing of conventional form applied to one of the crank pins.

Each supporting stand consists of a plurality of connected members, here shown as 3, which when set up form an open triangular frame having a base 5 and sides 6, which parts may be simple angle irons. The side strips 6 are pivotally connected to the base, as indicated at 7, and to each other at their intersection, as by the removable bolt 8, whereby to permit the frame to be collapsed for purposes of transportation. The base strip 5 may each be conveniently formed with an integral bench-clamp 9, provided with a thumb screw 10 whereby the frames 1 and 2 may be rigidly attached to the bench in the relation indicated. This construction is illustrated in detail in Fig. 6, wherein one of the sides of the angle strip is shown as cut down and bent over the other, as indicated at 9', to provide the bench clamping hook 9. By varying the distance between the frames 1 and 2, shafts of different lengths may be readily accommodated upon the stand.

Beyond the pivots 8, the legs 6 extend as journals 6' providing V-shaped seats in which the crank shaft is supported to freely swing through the unobstructed space between the supports 1 and 2. Each end of the crank shaft thus has bearing at at least two points along the extensions 6'. If desired, overhead bearing upon the crank shaft may be provided, as by the crossed links 11, which are pivoted at 12 in elongated slots 13 formed in the extensions 6', and have their free ends slotted as indicated at 14 to receive a common connecting bolt 15. The crossed links 11 thus provide a journal of inverted V-form, which with the opposing journal provided by the extensions 6' constitutes a complete bearing for the crank shaft at each end thereof. This construction is particularly adapted for testing the shaft for trueness, where the crank shaft is rotated on its axis. This may be conveniently accomplished by applying to one end of the crank shaft beyond the frames 1 or 2 a pulley 16, (see Fig. 1,) which may be connected with any suitable power source. By this construction I avoid the use of a lathe, as is now required and which may not always be available at the place where the fitting is being made, my construction in effect serving as a lathe for this operation.

The slotted connections at 12, 13 and 14, 15 allow the effective space between the links 11 and extensions 6' to be increased or diminished to accommodate shafts of varying diameters, as indicated in Figs. 2 and 3, and the bolt 15 is removable from the slots 14 to permit collapsing of the frames. When the links are opened, the crank shaft may be readily laid into the V-shaped supports 6' from above.

In order to prevent injury to the crank shaft, as by scratching, the extensions 6' may each carry a protective element, which as here shown consists of a strip of fiber or the like 17, recessed as shown in Fig. 5 to receive a surfacing of felt or the like 18, which may be lubricated to reduce friction, as by means of an oil hole 19 let into the fiber pad. The exposed faces of the links 11 may also be suitably covered if desired.

I thus provide a simple and convenient stand which may be readily set up and collapsed and which when set up affords adequate support and bearing for the crank shaft while disposing the cranks thereof in such manner as to freely swing through the unobstructed space between the frames 1 and 2. The apparatus may be readily adjusted to accommodate shafts of varying diameters and lengths, while the protective elements 17 eliminate the liability of scratching or otherwise marring the polished surface of the shaft itself.

Various modifications in the form and construction of my stand may obviously be resorted to within the limits of the appended claims.

I claim:—

1. A work stand for supporting a crank shaft or the like in free swinging relation, comprising a pair of frames adapted to be set up in spaced vertical relation to each other, each frame comprising a mounting base adapted to be attached to a suitable support and a pair of converging side members secured at their lower ends to said base and at their upper ends to each other whereby the space separating the side members of one frame from the side members of the opposite frame is wholly unobstructed through any plane lying between the mounting bases and the upper ends of the frames, permitting the cranks of the shaft to turn freely between the frames, and said side members at their point of connection with each other providing alined seats for the ends of the crank shaft.

2. A supporting stand for crank shafts and the like, comprising a pair of spaced frames between which the cranks of the shaft may freely turn, each frame having converging side members detachably connected to each other at their intersection and there providing seats adapted to receive the ends of the shaft, and links mounted upon said side members and detachably connected to each other above the point of intersection of the side members and providing overhead bearing upon the crank shaft supported in said seats.

3. A work stand for supporting a crank shaft or the like in free swinging relation, comprising a pair of frames adapted to be set up in spaced vertical relation to each other, each frame comprising a mounting base adapted to be attached to a suitable support and a pair of crossed side members pivotally secured at their lower ends to said base adjacent the ends thereof and pivotally secured to each other at their point of intersection whereby the space separating the side members of one frame from the side members of the opposite frame is wholly unobstructed through any plane lying between the mounting bases and the upper ends of the frame members permitting the cranks of the shaft to turn freely between the frames, and said side members at their point of intersection with each other providing alined seats for the ends of the crank shaft.

4. A supporting stand for crank shafts and the like, comprising a pair of spaced frames between which the cranks of the shaft may freely turn, each frame having a base member provided with a bench clamp and converging side members pivotally connected to said base member and detachably connected to each other at their intersection and there providing seats for the ends of the crank shaft, and crossed links adjustably mounted upon said side members and detachably connected to each other above the point of intersection of the side members and providing overhead bearing upon the crank shaft supported in said seats.

5. A stand for supporting a crank shaft or the like in free swinging relation, comprising a pair of frames adapted to be set up in spaced vertical position, the space between said frames being unobstructed whereby the cranks of the shaft may turn freely between the frames, and each frame having converging side members collapsibly connected to each other and providing at their inter-section V-shaped seats for the ends of the crank shaft, and protective elements mounted upon said side members at said seats.

6. A supporting stand of the class described, comprising a pair of spaced frames, each frame having converging side members connected to each other at their intersection, and extended beyond said intersection to provide V-shaped seats adapted to receive a shaft, said extensions having elongated slots, and a pair of links adjustably mounted in said slots and detachably connected to each other above the point of intersection of said side members and providing overhead bearing upon the shaft supported in said V-shaped seats.

Signed at Arlington Heights, in the county of Middlesex, and State of Massachusetts, this 14th day of August, 1919.

GEORGE A. LYON.

Witnesses:
   JAS. M. BROWN,
   JOHN F. OLSEN.